United States Patent [19]

Kil

[11] Patent Number: 5,769,754

[45] Date of Patent: Jun. 23, 1998

[54] KICKDOWN CONTROL METHOD FOR AUTOMATIC TRANSMISSION

[75] Inventor: Sung-Hong Kil, Seoul, Rep. of Korea

[73] Assignee: Hyundai Motor Company, Seoul, Rep. of Korea

[21] Appl. No.: 769,727

[22] Filed: Dec. 18, 1996

[30] Foreign Application Priority Data

Dec. 20, 1995 [KR] Rep. of Korea ...................... 95-52782

[51] Int. Cl.$^6$ .................................................. B60K 41/10
[52] U.S. Cl. .......................... 477/133; 477/149; 477/905
[58] Field of Search .................................. 477/132, 133, 477/148, 149, 905

[56] References Cited

U.S. PATENT DOCUMENTS

| | | | |
|---|---|---|---|
| 4,833,945 | 5/1989 | Kondo ..................................... | 477/133 |
| 5,092,199 | 3/1992 | Goto et al. ............................... | 477/149 |
| 5,319,998 | 6/1994 | Iwatsuki et al. ......................... | 477/149 |
| 5,624,351 | 4/1997 | Fujita et al. ............................. | 477/148 |
| 5,662,548 | 9/1997 | Mori ....................................... | 477/905 |

*Primary Examiner*—Dirk Wright
*Attorney, Agent, or Firm*—Christie, Parker & Hale, LLP

[57] ABSTRACT

A kickdown control method for automatic transmission wherein a transmission control unit TCU receives signals regarding three variables for a throttle opening rate just prior to an abrupt operation of the accelerator pedal, the vehicle speed and the throttle opening rate changes during the operation of the accelerator pedal; if the throttle opening rate is lower than 20%, the vehicle speed is lower than 20 Km/h and the throttle opening rate change is lower than 30%, the transmission control unit TCU applies to the pressure control solenoid valve a first duty control pattern in which duty rate is constant with respect to time changes from shift start point; and if any one of said variables equal to or higher than the above reference values, the transmission control unit TCU applies to the pressure control solenoid valve a second duty control pattern in which the applied duty rate changes in multi-steps with regard to time change from shift start point.(Fig. 5)

6 Claims, 4 Drawing Sheets

KICKDOWN CONTROL METHOD FOR AUTOMATIC TRANSMISSION

BACKGROUND OF THE INVENTION

1. Field of the Invention

This invention relates generally to a kickdown control method for an automatic transmission.

In particular, it relates to a kickdown control method for shifting down from a higher$^{speed}$ position to a lower$^{speed}$ position for an automatic transmission wherein when an accelerator pedal is depressed abruptly in order to accelerate a vehicle rapidly during running, a transmission control unit applies different duty rates to a pressure control solenoid valve according to variables of a throttle opening rate just prior to an abrupt operation of the accelerator pedal, and vehicle speed and changes of the throttle opening rate are detected during the operation of the pedal to satisfy a rapid speed-up response and a good shift feeling as well.

2. Description of the Prior Art

A conventional hydraulic automatic transmission includes a torque converter and a multi-stage transmission gear mechanism connected with the torque converter, and a hydraulic control system for establishing gear stages of the transmission gear mechanism in accordance with operational conditions of a vehicle.

The torque converter includes a pump which directly connected to a crank shaft, to be rotated at a same speed as that of an engine and to transform mechanical energy of engine to kinetic energy of fluids, a turbine installed at an input shaft of the transmission in order to receive fluids supplied from a pump and to transform kinetic energy of fluids to mechanical energy and to transfer the energies to the input shaft, and a stator disposed between the pump and the turbine in order to further increase output torque of the turbine than the torque from the engine to the pump by changing directions of oil flowing from the pump to the turbine.

The transmission gear mechanism employs a plurality of sun gears, planetary gears and ring gears, and thereby controls torque, speed and orientation of the turbine with an appropriate transmission ratio and transfers same to a propelling shaft Further, the hydraulic control system comprises an oil pump for generating hydraulic pressure, various sensors for detecting positions of a select lever, throttle opening rate etc., a valve body having shift valves and control valves, and an actuator having frictional members such as a multi-disc clutch and a band brake.

The hydraulic control typed automatic transmission comprising various devices as described above serves to determine shift timings by controlling hydraulic pressure of operational fluid for automatic control of the transmission and actuate the multi-disc clutch and the band brake.

However, there is a problem in the hydraulic control system of an automatic transmission, in that frictions of operational fluid with oil tubes, delay of pressure forming, discordance of pressure of the operational fluid with necessary pressure for shifting and other reasons are combined to cause a decrease in efficiency of an automatic transmission. Furthermore, quality of shifting also poses as a big problem.

Therefore, an electronic control system has been incorporated into the hydraulic control system in order that pressure of operational fluid has functions for actuating a multi-disc clutch and a brake, and an electronic device charged with functions to select shift timings and to control adjusting hydraulic pressure proper for transferring the torque.

Important functions of the above-mentioned electronic control typed transmission encompass a shift timing control including shift mode, a line pressure control for avoiding shift shock, a lock-up clutch control for 100% transferring of engine output to the transmission in order to decrease fuel consumption, and a fail-safe control for preventing a rear drive gear from being connected even when the select lever is operated to an R position in a vehicle speed faster than a predetermined speed or for permitting a forward drive to stay within limited ranges by operation of the select lever just like in the manual transmission when the control system is out of order.

These functions are controlled by Transmission Control Unit(TCU) with duty controls according to signals from various sensors for detecting running conditions, and the transmission control unit calculates and applies control factors to solenoid valves according to the programed control modes.

Shift timing control is performed such that shift timing is decided automatically according to programmed maps of the transmission control unit TCU by taking a running speed and an engine load (throttle opening rate) into major input variables. The transmission control unit TCU controls On/Off of a plurality of solenoid valves according to the predetermined shift timing, thereby actuating a hydraulic pressure circuit to obtain automatical shift operations.

As shown in FIG. 1 illustrating an electronically controlled automatic transmission of 4 gear stages under the condition of 1st speed in D range, the transmission control unit TCU turns on a shift control solenoid valve A 100 and a shift control solenoid valve B 101 by providing control currents to the valves, so that line pressure is discharged through an exit port EX. And the transmission control unit TCU turns on a pressure control solenoid valve 103 while it turns off a damper clutch solenoid valve 102, thereby a pressure control valve 104 moves leftmost and shuts off the line pressure.

Accordingly, because a shift control valve 105 is not actuated at all, the line pressure actuates a rear clutch 108 through N–D control valve 106 and a rear clutch exhaust valve 107. And it facilitates a vehicle to start.

Meanwhile, in the hydraulic pressure circuit of 2nd speed position in D range shown in FIG. 2, the transmission control unit TCU turns off the pressure control solenoid valve 103 and moves the pressure control valve 104 in right direction, so that the line pressure is provided to an 1–2 shift valve 109.

At the same time, the transmission control unit TCU turns off the shift control solenoid valve A 100 while it turns on the shift control solenoid valve B 105, thereby moving the shift control valve 105 in the right direction.

Therefore, the line pressure enters in the 1–2 shift valve and also moves the shift control valve B 105 in the right direction, so that the line pressure coming through the pressure control valve is sent to a kick down servo mechanism 109 to establish a 2nd speed.

The transmission control unit TCU controls two shift control solenoid valves A and B, a pressure control solenoid valve and a damper clutch control solenoid valve, so as to form an appropriate hydraulic pressure in the fluid circuit, thereby performing automatical shift operation by controlling movement of frictional members.

During the shift timing control processes, the transmission control unit TCU also controls also the line pressure by controlling the pressure control solenoid valve, so that shift shocks are reduced upon shift operation, comfortableness of a vehicle is improved and the best shift feeling is obtained.

Meanwhile, if an accelerator pedal is depressed abruptly, kickdown control where the transmission is forcibly shifted down from higher speed position to lower speed position, is performed in order to increase propelling force of a vehicle. Such kickdown control is performed by controlling two shift control solenoid valves and one pressure control solenoid valve.

By way of example, if the transmission control unit TCU receives signals with respect to an abrupt pedal operation during running at the 2nd speed in D range, the transmission control unit TCU turns on two shift control solenoid valves and controls the duty rate applied to the pressure control solenoid valve, thereby the transmission is forcibly shifted down from the 2nd speed position of D range to the 1st speed position of D range.

Hence, it is found that speed-up response and shift feeling are changed substantially according to duty control patterns applied to the pressure control solenoid valve. The conventional transmission control unit TCU has performed the duty control for the pressure control solenoid valve focusing on either speed-up response or shift feeling of the transmission.

As shown in FIG. 3 for illustrating an example of 2–1 kickdown control from 2nd speed to 1st speed of D range, a duty control command which the transmission control unit TCU send to a pressure control solenoid valve is applied by a single step form wave rising from a shift start point, and therefore servo apply pressure AS of the kickdown servo mechanism decreases rapidly while pressure of the rear clutch 108 is maintained constantly.

Reference symbol Nt in FIG. 3 indicates speed at the turbine of the automatic transmission.

If the servo apply pressure decreases rapidly under the condition that pressure of the rear clutch is maintained constantly as described above, it has merits in that the shift down operation from 2nd speed position to 1st speed position of the transmission is rapidly performed, so speed-up response becomes faster, but it has demerits in that shift shock becomes stronger, so, shift feeling is worse.

Further, as shown in FIG. 4 which illustrates another example of kickdown control from 2nd speed to 1st speed of D range, the duty control command which the transmission control unit TCU send to the pressure control solenoid valve by two or more step form waves changing from the shift start point to the shift termination point, and servo apply pressure of the kickdown servo mechanism decreases slowly and stepwise while pressure of the rear clutch 108 is maintained constantly.

If the servo apply pressure decreases slowly under the condition that the rear clutch pressure is maintained at a constant level, a shift command for 1st speed is applied while 2nd speed is maintained in the shift starting point, so that the shift start point does not accord with the commanding point. As a result, the shift feeling becomes smooth, but the speed-up response becomes slow.

Accordingly, it is an object of the present invention to provide a kickdown control method for automatic transmission which when the accelerator pedal is depressed abruptly for a rapid acceleration, the transmission control unit TCU applies different duty control patterns to pressure control solenoid valve according to a throttle opening rate just prior to the abrupt operation of the pedal, a current vehicle speed and a change of throttle opening rate during the abrupt operation of the pedal, in order to satisfy both the fast speed-up response and the good shift feeling.

SUMMARY OF THE INVENTION

To accomplish the above and other objects, the present invention is provided with a kickdown control method for automatic transmission, the method comprising steps of detecting operation of an accelerator pedal for rapid acceleration, turning on two shift control solenoid valves by applying control currents thereto, and performing duty control to a pressure control solenoid valve, characterized in that the transmission control unit TCU receives signals regarding three variables for the throttle opening rate just prior to an abrupt operation of the accelerator pedal, the vehicle speed and the throttle opening rate changes during operation of the accelerator pedal;

if the throttle opening rate is lower than 20%, the vehicle speed is lower than 20 Km/h and the throttle opening rate change is lower than 30%, the transmission control unit TCU applies to the pressure control solenoid valve a first duty control pattern whose duty rate is constant with respect to time changes from shift start point; and if any one of said variables equal to or higher than the above reference values, the transmission control unit TCU applies to the pressure control solenoid valve a second duty control pattern in which the applied duty rate changes in multi-steps with regard to time change from shift start point.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

The kickdown control method according to the present invention features that a transmission control unit TCU controls a pressure control solenoid valve with two patterns for the duty rate change according to the abrupt operation of accelerator pedal and the current vehicle speed. By way of example a 2–1 kickdown is disclosed.

The present invention therefore can satisfy both the speed-up response corresponding to the operational conditions of the accelerator pedal and the vehicle speed and the shift feeling.

Figure 5:
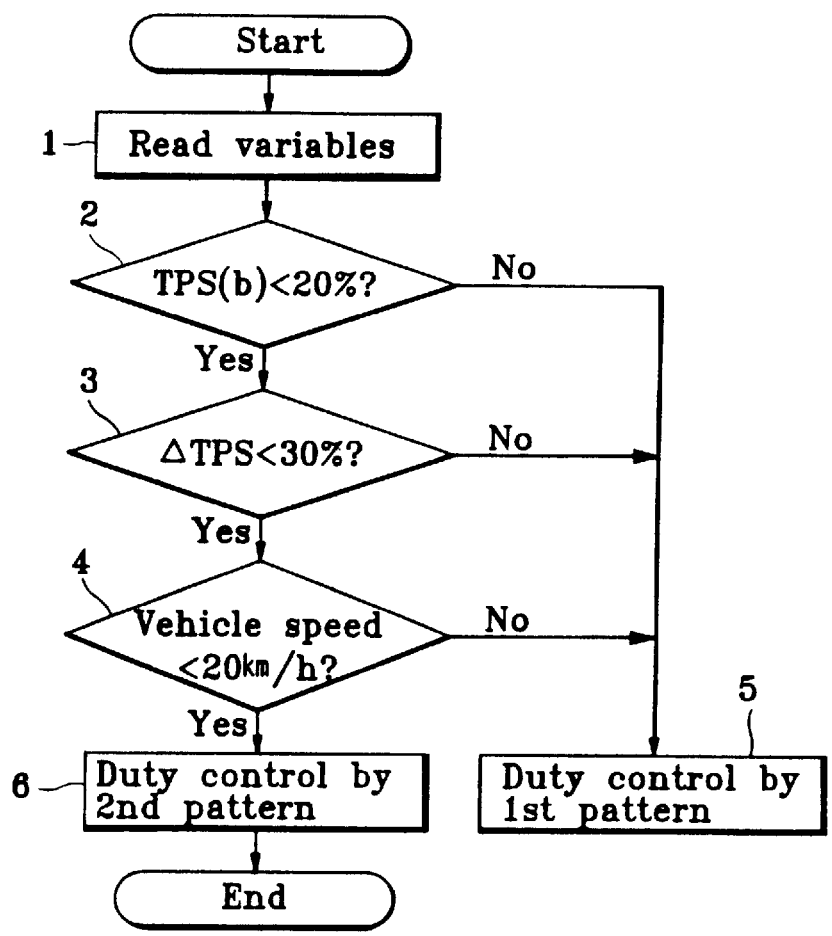
FIG. 5 is a flow chart showing a 2–1 kickdown control according to the present invention for an electronic control automatic transmission of 4 gear stages.

Referring to the flow chart of FIG. 5, if the accelerator pedal is depressed abruptly, the transmission control unit TCU receives the signal from an accelerator pedal switch, and starts a kickdown shift control (a starting step). The starting step consists of a 1st step where the transmission control unit TCU read s run sin r and operational conditions of a vehicle by various sensors such as a vehicle speed sensor, a throttle opening rate sensor, and the like, and a 2nd step where the transmission control unit TCU determines whether the throttle opening rate is lower than 20% of the full opening.

If the throttle opening rate is equal to or higher than 20%, control flow directly proceeds from the 2nd step to a 5th step and a duty control for pressure control solenoid valve is performed according to a first duty control pattern. But if the throttle opening rate is lower than 20%, the control flow proceeds to next steps.

At step s that follow, the transmission control unit TCU determines whether a throttle opening r ate change(ΔTPS) is lower than 30% (a 3rd step). If throttle opening rate change (ΔTPS) is equal to or higher than 30%, the control flow directly proceeds from the 3rd step to the 5th step where the duty control for the pressure control solenoid valve is also performed according to the first duty control pattern. However, if the throttle opening rate change is lower than 30%, the contr ol flow proceeds to the next step.

In a 4th step, the transmission control unit TCU determines whether the current vehicle speed just prior to the abrupt operation of the accelerator pedal is slower than 20 Km/h. If the vehicle speed is equal to or faster than 20 Km/h, the control flow directly proceeds from the 4th step to a 5th step like the above processes and the duty control is also performed according to the first duty control pattern.

However, if the vehicle speed is equal to or faster than 20 Km/h, the control flow proceeds to a 6th step, where the duty control is performed according to the second duty control pattern.

Figure 3:
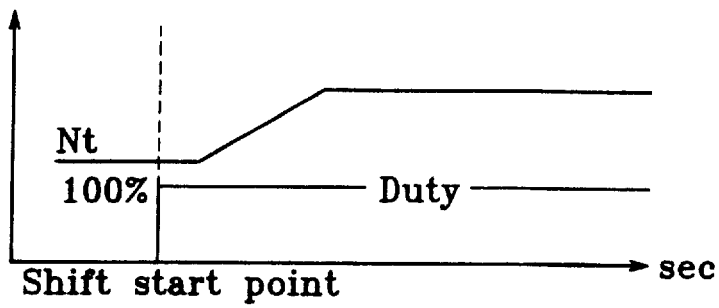
FIG. 3 is a diagram showing a 2–1 kickdown control according to a conventional electronic control automatic transmission of 4 gear stages..
Figure 3:
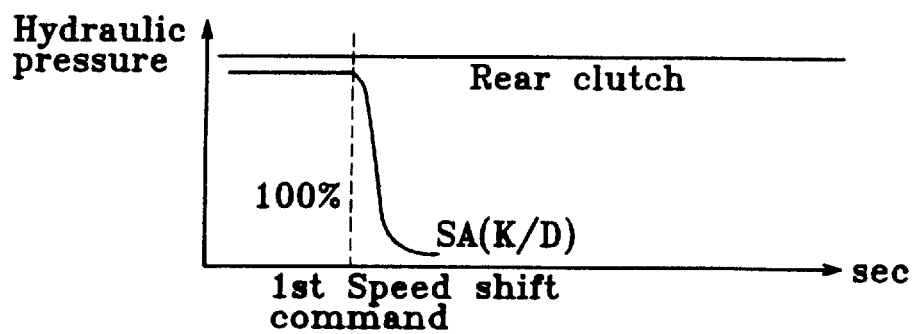

The first duty control pattern is shown in FIG. 3 and the transmission control unit TCU performs a first kind of the conventional duty rate control. It means that the duty rate applied from the transmission control unit TCU to the pressure control solenoid valve takes a single step form wave, whereby a rapid shift is performed. As a result therefrom, the speed-up response becomes fast.

Accordingly, in case the vehicle speed is high and the depressed amount of the accelerator pedal is large while the depressed action of the pedal is slow, a rapid shifting down is performed to improve the speed-up response.

Figure 4:
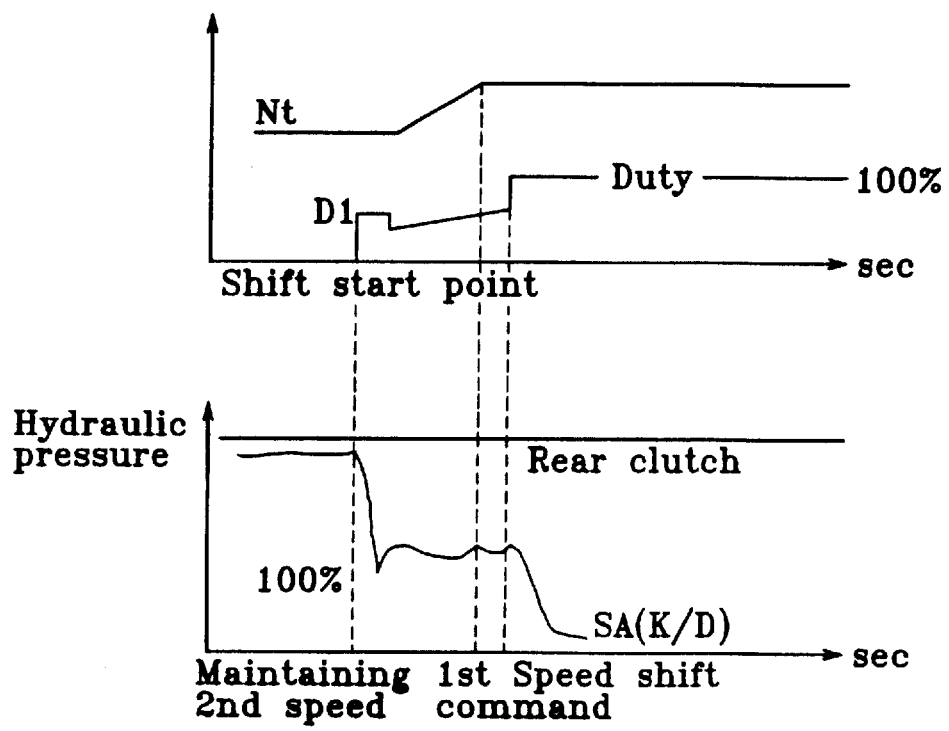
FIG. 4 is a diagram showing another 2–1 kickdown control according to a conventional electronic control automatic transmission of 4 gear stages.

The second duty control pattern is shown in FIG. 4 where it shows the transmission control unit TCU performs a second kind of a conventional duty rate control. It means that the duty rate control applied from transmission control unit TCU to the pressure control solenoid valve becomes two or more step form wave, so that a shift shock is greatly reduced and shift feeling becomes better.

Accordingly, in case the vehicle speed is relatively slow and the depressed amount of the accelerator pedal is small while the depressed action of the pedal is slow, the slow shifting down to the 1st speed position is performed to improve the shift feeling.

Meanwhile, it should be noted that, although the reference values of the throttle opening rate, the throttle opening rate change and the vehicle speed are respectively defined to 20%, 30% and 20 Km/h in the above described embodiment of the invention, the values are not limited to those values and can be set to other values.

The invention has thus been shown and described with reference to a specific embodiment, however, it should be noted that the invention is in no way limited to the details of the illustrated arrangements but changes and modifications may be made without departing from the scope of the appended claims.

What is claimed is:

1. A kickdown control method for an automatic transmission, the method comprising steps of detecting operation of an accelerator pedal for rapid acceleration, turning on two shift control solenoid valves by applying control currents thereto, and performing duty control to a pressure control solenoid valve, characterized in that a transmission control unit TCU receives signals regarding three variables for the throttle opening rate just prior to an abrupt operation of the accelerator pedal, the vehicle speed and the throttle opening rate changes during the operation of the accelerator pedal, compares the detected values with reference values, selects one pattern among a plurality of duty control patterns where duty rate change with regard to time change are different each other, and performs the kickdown control according to the selected duty control pattern.

2. A kickdown control method for automatic transmission in accordance with claim 1 wherein said duty control patterns include a first duty control pattern whose applied duty rate is constant with regard to time changes rising from a shift start point, a second duty control pattern whose duty rate increases in multi-steps with regard to time changes from the shift start point.

3. A kickdown control method for automatic transmission in accordance with claim 1 or 2 wherein the reference value of a throttle opening rate is 20%.

4. A kickdown control method for automatic transmission in accordance with claim 1 or 2 wherein the reference value of the throttle opening rate change is 30%.

5. A kickdown control method for automatic transmission in accordance with claim 1 or 2 wherein the reference value of the vehicle speed is 20 Km/h.

6. A kickdown control method for automatic transmission, the method comprising steps of detecting operation of an accelerator pedal for rapid acceleration, turning on two shift control solenoid valves by applying control currents thereto, and performing duty control to a pressure control solenoid valve, characterized in that the transmission control unit TCU receives signals regarding three variables for the throttle opening rate just prior to an abrupt operation of the accelerator pedal, the vehicle speed and the throttle opening rate changes during the operating of the accelerator pedal;

if the throttle opening rate is lower than 20%, the vehicle speed is lower than 20 Km/h and the throttle opening rate change is lower than 30%, the transmission control unit TCU applies to the pressure control solenoid valve a first duty control pattern whose duty rate is constant with respect to time changes from shift start point; and if any one of said variables equal to or higher than the above reference values, the transmission control unit TCU applies to the pressure control solenoid valve a second duty control pattern in which the applied duty rate changes in multi-steps with regard to time change from shift start point.

* * * * *

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Abstract, line 1, before "automatic" insert -- an --.
Abstract, line 11, before "shift" insert -- the --.
Abstract, lines 12,13, replace "equal to or higher" with -- equals to
    or is higher --.
Abstract, line 13, change "above reference" to -- above-referenced --.
Abstract, line 16, before "shift" insert -- the --.
Abstract, line 17, after "point." delete "(Fig. 5)".
Column 1, line 9, replace "shifting down from a higher/$^{speed}$ position to a
    lower/$^{speed}$ with -- downshifting from a higher/speed position to a
    lower/speed --.
Column 1, line 10, after "transmission" delete "wherein".
Column 1, line 12, replace "rapidly during running, a" with
    -- rapidly. A --.
Column 1, line 15, after "pedal," delete "and".
Column 1, lines 16-18, replace "changes of the throttle opening rate are
    detected during the operation of the pedal to satisfy a rapid
    speed-up response and a good shift feeling as well." with
    -- changes in the throttle opening rate during the operation
    of the pedal to achieve a rapid speed-up response and a smooth
    shift. --.
Column 1, line 21, replace "converter and a" with -- converter, a --.
Column 1, line 22, replace "connected with" with -- connected to --.
Column 1, line 26, replace "pump which" with -- pump, which is --.
Column 1, lines 27,28, replace "a same speed as that of an engine" with
    -- the same speed as the engine --.
Column 1, line 28, after "energy of" insert -- the --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 1, lines 31,32, replace "a pump and to transform kinetic energy of fluids" with -- the pump and to transform the kinetic energy of the fluids --.
Column 1, line 32, replace "energies" with -- mechanical energy --.
Column 1, line 34, replace "increase output" with -- increase the output --.
Column 1, line 35, replace "turbine than" with-- turbine beyond --.
Column 1, line 36, replace "directions" with -- the direction --.
Column 1, line 41, replace "same" with -- the --.
Column 1, line 42, after "shaft" insert a period.
Column 1, line 45, after "rate" insert a comma.
Column 1, line 49, change "typed" to -- type --.
Column 1, line 50, after "above" delete "serves".
Column 1, line 53, replace "actuate" with -- actuation of --.
Column 1, line 55, change "frictions" to -- friction --.
Column 1, line 58, replace "shifting and other reasons are" with -- shifting as well as other problems --.
Column 1, line 60, after "poses" delete "as".
Column 1, line 63, replace "pressure of operational fluid has functions for actuating" with -- the pressure of the operational fluid functions to actuate --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 1, lines 64-66, replace "brake, and an electronic device charged with functions to select shift timings and to control adjusting hydraulic pressure proper for transferring the torque." with -- brake. The electronic control system further functions to select shift timings and to control adjusting hydraulic pressure for proper torque transfer. --.

Column 2, line 2, change "typed" to -- type --.
Column 2, line 4, change "transferring" to -- transfer --.
Column 2, line 8, replace "in a vehicle speed faster than" with -- when the vehicle speed exceeds --.
Column 2, line 14, change "Unit(TCU)" to -- Unit (TCU) --.
Column 2, line 14, replace "conditions, and the" with -- conditions. The --.
Column 2, line 17, after "according to" delete "the"
Column 2, line 17, change "programed" to -- programmed --.
Column 2, line 18, after "such that" insert -- the --.
Column 2, lines 21-24, replace "by taking a running speed and an engine load (throttle opening rate) into major input variables. The transmission control unit TCU controls On/Off of a plurality of solenoid valves" with -- according to the speed of the vehicle and an engine load (throttle opening rate). The transmission control unit TCU turns a plurality of solenoid valves on and off --.

Figure 1:
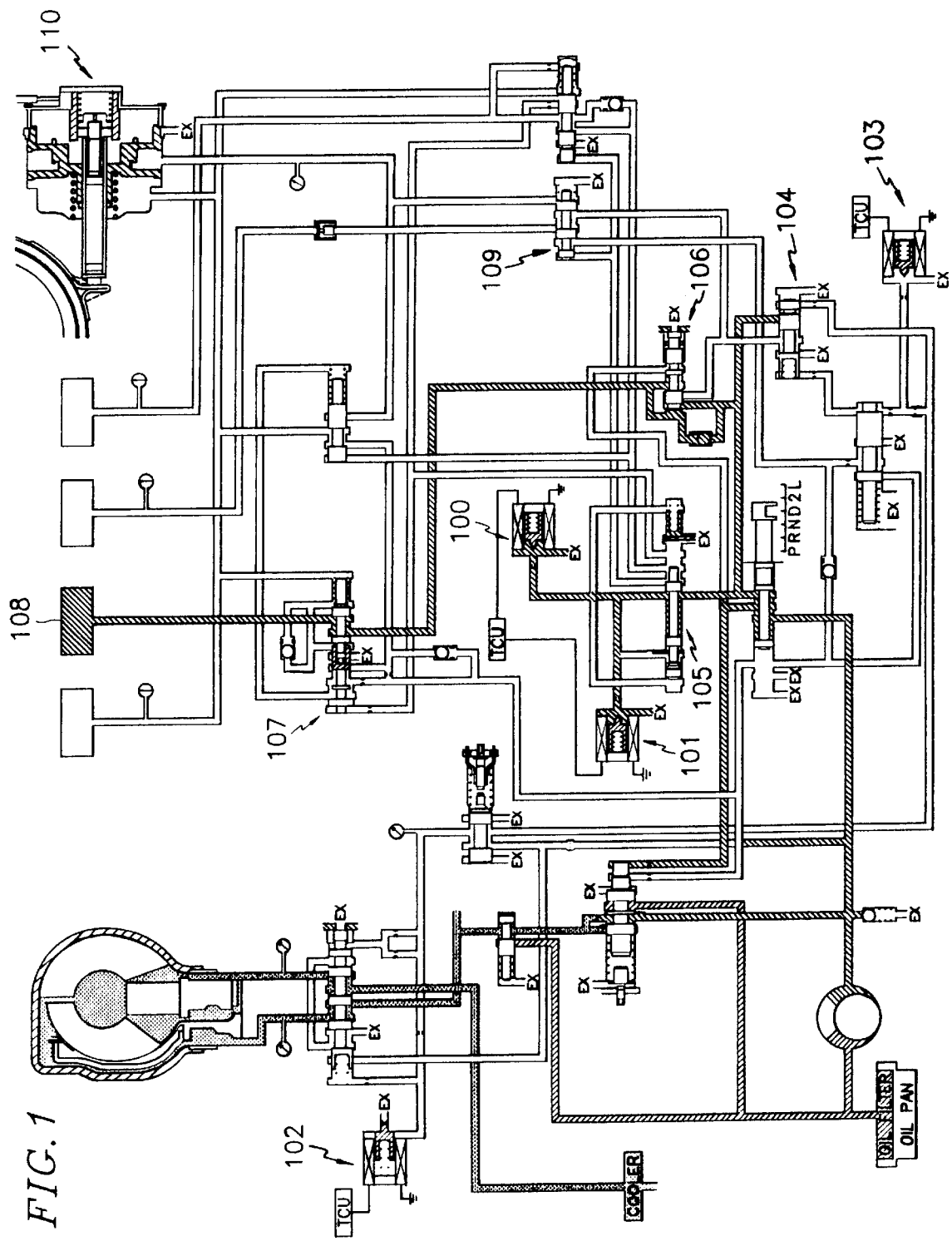
FIG. 1 shows a hydraulic circuit under the condition of 1st speed position of D range according to a conventional electronic control automatic transmission of 4 gear stages.

Column 2, line 26, change "automatical" to -- automatic --.
Column 2, line 27, after "FIG. 1" insert a comma.
Column 2, line 28, change "of 4" to -- with four --.
Column 2, line 29, change "1st" to -- first --.
Column 2, line 33, change "And the" to -- The --.

UNITED STATES PATENT AND TRADEMARK OFFICE
CERTIFICATE OF CORRECTION

PATENT NO.  : 5,769,754
DATED       : June 23, 1998
INVENTOR(S) : Sung-Hong Kil

Figure 2:
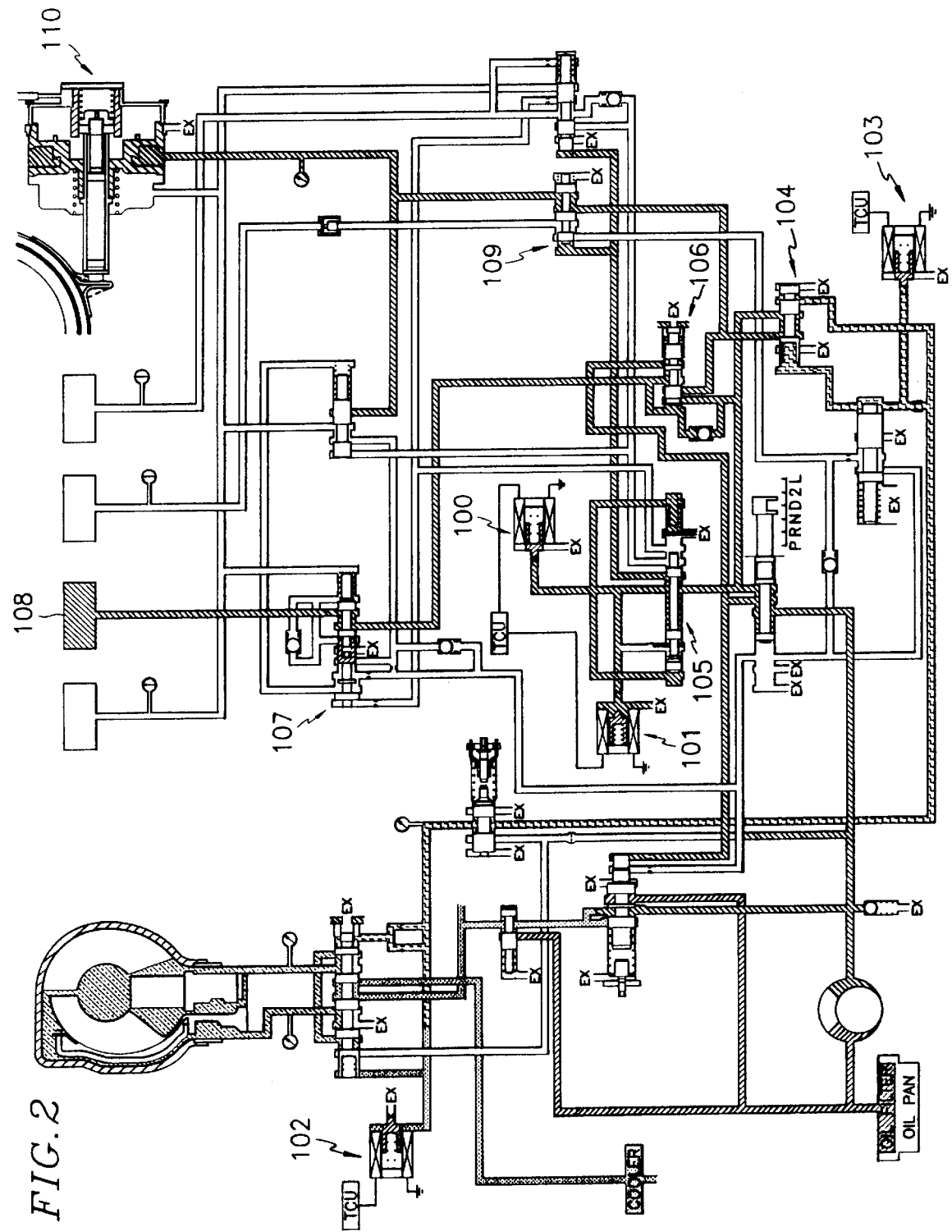
FIG. 2 shows a hydraulic circuit under the condition of 2nd speed position of D range according to a conventional electronic control automatic transmission of 4 gear stages.

It is certified that error appears in the above-identified patent and that said Letters Patent is hereby corrected as shown below:

Column 2, line 35, after "thereby" insert -- causing --.
Column 2, line 36, replace "moves leftmost and shuts" with -- move leftmost and shut --.
Column 2, line 38, delete "at all".
Column 2, line 41, replace "And it facilitates" with -- It enables --.
Column 2, lines 42,43, replace "Meanwhile, in the hydraulic pressure circuit of 2nd speed position in D range shown in FIG. 2, the" with -- The hydraulic pressure circuit of the second speed position in D range is shown in FIG. 2. The --.
Column 2, line 45, after "104 in" insert -- the --.
Column 2, line 46, change "an" to -- a --.
Column 2, line 52, after "enters" delete "in".
Column 2, line 56, change "2nd" to -- second --.
Column 2, lines 60,61, replace "circuit , thereby performing automatical" with -- circuit, thereby performing an automatic --.
Column 2, line 64, replace "also controls also" with -- controls also --.
Column 2, lines 66,67, replace "upon shift operation, comfortableness of a vehicle is improved and the best shift feeling is obtained." with -- during the shift operation enabling a more comfortable ride. --.
Column 3, line 1, replace "Meanwhile, if an" with --If the --.
Column 3, line 2, after "control" insert a comma.
Column 3, line 22, replace "increase propelling force of a vehicle." with -- increase the propelling force of the vehicle. --.
Column 3, line 10, replace "during running at the 2nd speed" with -- in the second speed --.
Column 3, line 14, change "2nd" to -- second --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 3, line 14, change "1st" to -- first --.
Column 3, line 16, replace "Hence, it is found that speed-up response and shift feeling" with -- It is found that speed-up response and the smooth shifting of the automatic transmission --.
Column 3, line 20, replace "shift feeling of the" with -- smooth shifting of the automatic --.
Column 3, line 22, change "2nd" to -- second --.
Column 3, line 22, change "1st" to -- first --.
Column 3, line 24, change "send" to -- sends --.
Column 3, line 25, change "form wave" to -- waveform --.
Column 3, line 26, replace "apply pressure AS of "with -- pressure applied to --.
Column 3, line 27, replace "of the rear" with -- to the rear --.
Column 3, line 28, change "constantly" to -- constant --.
Column 3, lines 29,30, replace "speed at the turbine of "with -- the speed of the turbine in --.
Column 3, lines 31,32, replace "apply pressure decreases rapidly under the condition that"with -- pressure decreases rapidly when the --.
Column 3, lines 33,34, replace "constantly as described above, it has merits in that the shift down operation from 2nd speed position to 1st speed" with -- constant as described above, the downshift operation from the second speed position to the first speed --.
Column 3, line 35, after "so" insert -- the --.
Column 3, line 36, replace "but it has demerits in that shift" with -- but the shift --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 3, line 37, replace "stronger, so, shift feeling is worse" with
-- worse resulting in discomfort to the passenger. --.
Column 3, line 38, replace "Further, as shown in Fig. 4" with -- In Fig. 4 --.
Column 3, line 39, after "example of" insert -- the --.
Column 3, line 39, change "2nd" to -- second --; and change "1st" to
-- first --.
Column 3, line 40, after "command" insert a comma.
Column 3, line 41, change "send" to -- sends --.
Column 3, lines 41,42, replace "valve by two or more step form waves"
with -- valve, is a two or more step waveform --.
Column 3, lines 43,44, replace "apply pressure of" with
-- pressure applied to --.
Column 3, lines 44,45, replace "and stepwise" with
-- in a stepwise fashion --.
Column 3, line 46, change "constantly" to -- constant --.
Column 3, lines 47,48, replace "apply pressure decreases slowly under the
condition that" with -- pressure decreases slowly while --.
Column 3, line 49, change "1st" to -- first --.
Column 3, line 50, change "2nd" to -- second --.
Column 3, line 51, replace "accord" with -- coincide --.
Column 3, line 52, replace "shift feeling becomes" with -- shift is --.
Column 3, line 55, after "method for" insert -- an --.
Column 3, line 56, after "which" insert a comma.
Column 3, line 57, after "abruptly for" delete "a".
Column 3, line 58, after "patterns to" insert -- a --.
Column 3, line 60, change "a current" to -- the current --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 3, lines 62,63, replace "satisfy both the fast speed-up response and the good shift feeling." with -- achieve fast speed-up response and smooth shifting of the transmission. --.

Column 3, line 67, change "objects" to -- objectives --.

Column 4, line 1, replace "automatic transmission, the method comprising steps" with -- an automatic transmission. The method comprising the steps --.

Column 4, lines 4,5, replace "performing duty control" with -- controlling the duty rate --.

Column 4, lines 5,6, replace "valve, characterized in that the" with -- valve. The --.

Column 4, lines 10,11, after "pedal" change the semicolon to a period and place the sentence of the next paragraph on the same line; and change "if" to -- If --.

Column 4, line 11, replace "opening rate is" with -- opening is --.

Column 4, lines 16,17, replace "from shift start point; and if any one of said variables equal" with -- from the shift start point. Conversely, if any one of said variables is equal --

Column 4, line 18, change "above reference" to -- above-references --.

Column 4, line 21, replace "to time change from shift" with -- to the time change from the shift --.

Column 4, line 24, change "objects" to -- objectives --.

Column 4, line 28, change "1st" to -- first --.

Column 4, line 29, after "position of" insert -- the --.

Column 4, line 31, replace "of 4 gear stages." with -- with four gear stages; --.

UNITED STATES PATENT AND TRADEMARK OFFICE
CERTIFICATE OF CORRECTION

PATENT NO.  : 5,769,754
DATED       : June 23, 1998
INVENTOR(S) : Sung-Hong Kil

It is certified that error appears in the above-identified patent and that said Letters Patent is hereby corrected as shown below:

Column 4, line 33, change "2nd" to -- second --; and after "position of" insert -- the --.
Column 4, line 34, replace "of 4 gear stages." with -- with four gear stages; --.
Column 4, line 37, replace "of 4 gear stages." with -- with four gear stages; --.
Column 4, line 40, replace "of 4 gear stages." with -- with four gear stages; and --.
Column 4, line 43, replace "of 4" with -- with four --.
Column 4, lines 47,48, replace "features that a transmission control unit TCU controls" with -- features a transmission control unit TCU that controls --.
Column 4, line 53, replace "invention therefore" with -- invention, therefore, --.
Column 4, lines 55,56, replace "speed and the shift feeling" with -- speed, and the smooth shifting of the transmission --.
Column 4, line 61, change "1st" to -- first --.
Column 4, line 62, replace "read s run sin r and" with -- reads running and --.
Column 4, line 64, change "2nd" to -- second --.
Column 4, line 66, after "opening" delete "rate".
Column 5, line 1, after "opening" delete "rate".
Column 5, line 2, change "2nd" to -- second --; and change "5th" to -- fifth --.
Column 5, line 5, replace "rate is lower than" with -- is less than --.
Column 5, line 6, after "proceeds to" insert -- the --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 5, line 7, replace "At step s" with -- In the steps --.
Column 5, line 8, replace "r ate change(ΔTPS)" with -- rate of change (ΔTPS) --.
Column 5, line 9, replace "(a 3rd step). If throttle opening rate change" with -- (a third step). If the throttle opening rate of change --.
Column 5, line 11, change "3rd" to -- third --; and change "5th" to -- fifth --.
Column 5, line 14, after "rate" insert -- of --.
Column 5, line 15, change "contr ol" to -- control --.
Column 5, line 17, change "4th" to -- fourth --.
Column 5, line 20, change "4th" to -- fourth --; and change "5th" to -- fifth --.
Column 5, lines 23,24, replace "equal to or faster than 20Km/h" with -- less than 20 Km/h --.
Column 5, line 24, change "6th" to -- sixth --.
Column 5, line 27, replace "FIG. 3 and" with -- FIG. 3 where --.
Column 5, line 28, after "kind of" delete "the".
Column 5, line 30, replace "It means that the duty" with -- The duty --.
Column 5, lines 32,33, replace "takes a single step form wave" with -- has a single step waveform --.
Column 5, line 34, delete "therefrom".

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 5, lines 35-37, replace "in case the vehicle speed is high and the depressed amount of the accelerator pedal is large while the depressed action of the pedal is slow, a rapid shifting down" with -- When the vehicle speed is high the throttle opening is wide, and the rate of change of the throttle opening is fast, a rapid downshift --.
Column 5, line 40, after "shows" insert -- that --.
Column 5, line 41, after"kind of" delete "a".
Column 5, lines 41,42, replace "It means that the" with -- The --.
Column 5, line 44, replace "two or more step form wave, so that a shift" with -- a two or more step waveform, so that shift --.
Column 5, line 45, replace "shift feeling becomes better" with -- the shifting of the transmission is smoother --.
Column 5, lines 46-50, replace "Accordingly, in case the vehicle speed is relatively slow and the depressed amount of the accelerator pedal is small while the depressed action of the pedal is slow, the slow shifting down to the 1st speed position is performed to improve the shift feeling." with
-- Accordingly, when the vehicle speed is relatively slow, the throttle is not opened wide, and the rate of charge of the throttle opening is slow, the slow downshift to the first speed position is performed which improves the smoothness of the shift. --
Column 5, line 51, change "Meanwhile, it" to -- It --.
Column 5, lines 51,52, replace "opening rate, the throttle opening rate change" with -- opening, the throttle opening rate of change --.
Column 5, line 53, change "defined to" to -- defined at --.

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 6, lines 2-19, claim 1 should read:
-- 1. A kickdown control method for an automatic transmission, the method comprising the steps of:
 detecting operation of an accelerator pedal for rapid acceleration;
 turning on two shift control solenoid valves by applying control currents thereto;

turning on two shift control solenoid valves by applying control currents thereto;
 receiving at a transmission control unit TCU signals for three variables comprising a throttle opening prior to said operation of the accelerator pedal, a vehicle speed, and a throttle opening rate of change during the operation of the accelerator pedal;
 comparing values corresponding to the received signals with reference values;
 selecting one pattern among a plurality of duty control patterns, each of the duty control patterns having a different duty rate with regard to time changes from each other; and
 performing the kickdown control according to the selected duty control pattern. --.
Column 6, line 20, before "automatic" insert -- an --.
Column 6, line 22, after "whose" delete "applied".

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

Column 6, lines 23,24, after "changes" insert -- after --; and after "point," insert -- and --.
Column 6, line 28, before "automatic" insert -- an --.
Column 6, line 30, after "value of" delete "a" and insert therefor -- the --.
Column 6, line 30, after "opening" delete "rate".
Column 6, line 34, before "automatic" insert -- an --.
Column 6, line 33, after "rate" insert -- of --.

Column 6, lines 37-61, claim 6 shoud read as follows:
-- 6. A kickdown control method for an automatic transmission, the method comprising the steps of:
    detecting operation of an accelerator pedal for rapid acceleration;
    turning on two shift control solenoid valves by applying control currents thereto;
    receiving at a transmission control unit TCU signals for three variables comprising a throttle opening prior to said operation of the accelerator pedal, a vehicle speed, and a throttle opening rate of change during the operating of the accelerator pedal;
    applying from the TCU to a pressure control solenoid valve a first duty control pattern whose duty rate is constant with respect to time changes from a shift start point if the throttle opening is lower than 20%, the vehicle speed is lower than 20 Km/h, and the throttle opening rate of change is lower than 30%; and

UNITED STATES PATENT AND TRADEMARK OFFICE
CERTIFICATE OF CORRECTION

PATENT NO. : 5,769,754
DATED : June 23, 1998
INVENTOR(S) : Sung-Hong Kil

It is certified that error appears in the above-identified patent and that said Letters Patent is hereby corrected as shown below:

applying from the TCU to a pressure control solenoid valve a second duty control pattern whose duty rate changes in multi-steps with regard to time changes from the shift start point if the first duty control pattern is not applied by the TCU to the pressure control solenoid valve. --.

Signed and Sealed this

Sixth Day of February, 2001

*Attest:*

*Attesting Officer*

Q. TODD DICKINSON
*Director of Patents and Trademarks*